Oct. 27, 1953  G. L. LUCAS ET AL  2,656,706
LOCK COLLAR FOR TRAILER KINGPINS
Filed May 8, 1951
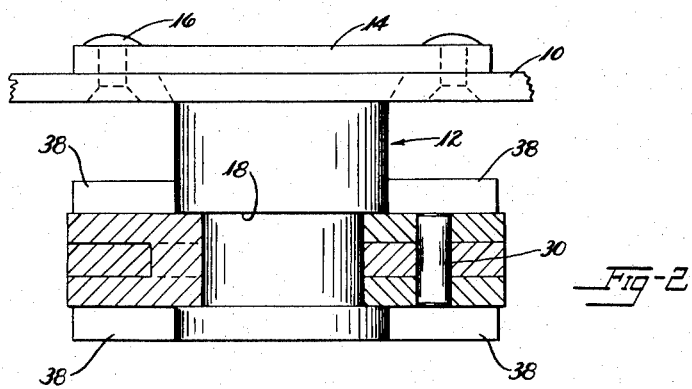
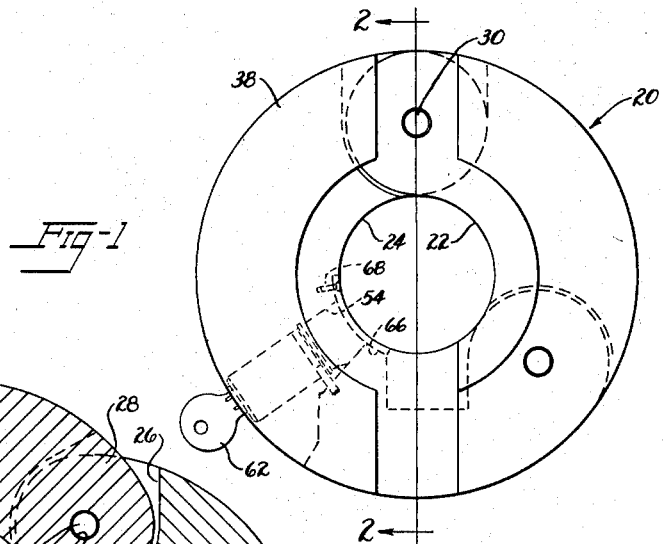
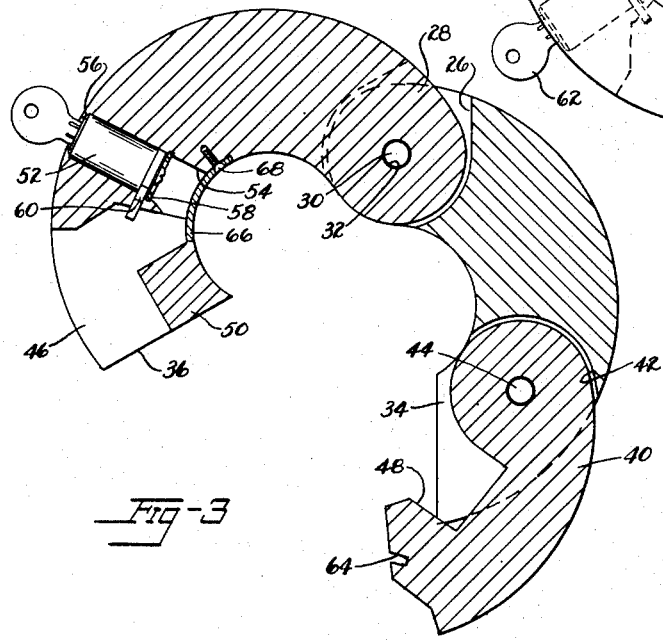
Inventors
Guy L. Lucas
William D. Edwards
Ralph S. Chaffin
BY Oldham & Oldham Patented Oct. 27, 1953

2,656,706

UNITED STATES PATENT OFFICE 2,656,706

LOCK COLLAR FOR TRAILER KINGPINS

Guy L. Lucas, William D. Edwards, and Ralph S. Chaffin, Akron, Ohio, assignors to Trail Lock Corporation, Akron, Ohio, a corporation of Ohio Application May 8, 1951, Serial No. 225,204

10 Claims. (Cl. 70—232)

Our invention relates to a lock collar and, more particularly, a lock collar which fits onto the kingpin of the upper fifth wheel plate of a trailer to prevent its locking engagement within the jaws of the fifth wheel of a tractor.

The coupling between truck tractors and trailers has been standardized so that any tractor can be coupled to any trailer throughout the trucking industry. Such coupling consists of a so-called fifth wheel mounted on the tractor which engages a kingpin extending downwardly beneath the frame of the trailer. Jaws on the fifth wheel engage an annular groove on the kingpin of the trailer to pivotally secure the trailer in position. Because such a coupling has been universally adopted, the theft of a trailer is not difficult, the criminals merely coupling onto any unguarded trailer with their own tractor. Various ways of locking a trailer to prevent such theft have been proposed in the prior art, such as locking the wheels or locking the brake system. Such arrangements, however, have proved ineffective or objectionable because of cost of installation or because they fail to prevent theft. While collars have been proposed which lock onto the kingpin to prevent engagement with the fifth wheel, such collars have been objectionable in that they are not strong enough to withstand a heavy blow by the fifth wheel itself. Other designs have been built consisting of several parts, such parts locking together. However, collars of this type are open to the objection that the parts become separated and lost.

It is the general object of our invention to avoid and overcome the foregoing and other objections to prior art practices by the provision of a split-collar type lock for a fifth wheel kingpin which is less expensive to manufacture, more rugged in its construction, tamper proof, and easy to install and remove.

Another object of our invention is the provision of a split collar which clamps around a fifth wheel kingpin of a trailer and locks in position to prevent the engagement of the kingpin with the fifth wheel on a tractor-trailer.

Another object of our invention is to provide a split collar in which all sections are hingedly secured together as a unit.

Another object of our invention is the provision of a lock collar for a fifth wheel kingpin which is locked in position by means of a simple key-operated lock, and yet has a great inherent strength.

These and other objects of our invention which will become apparent as the description proceeds are achieved by providing a split-collar lock for a fifth wheel kingpin, the kingpin having an annular groove, the collar including two substantially semi-annular hinged sections, the sections being the same thickness as the annular groove and the inner diameter of the collar being substantially equal to the diameter of the annular groove whereby the sections close around the kingpin within the annular groove. One of the sections has a slot in which a latch is pivotally secured. The opposing section has a similar slot, the latch engaging a catch portion bridging the last-named slot when the sections are in locking position. The latch has a notch adapted to engage the catch portion to securely link the two sections in locking position. A key-operated bolt is adapted to engage the latch to secure the latch in locking position with the catch.

For a better understanding of the invention, reference should be had to the accompanying drawings, wherein:

Fig. 1 is an elevational view of the lock collar;

Fig. 2 is a cross-sectional view taken substantially on the line II—II of Fig. 1 showing the collar in locked position on the kingpin; and Fig. 3 is a cross-sectional view taken substantially on the line III—III of Fig. 2, but with the collar in the unlocked or open position.

With specific reference to the form of the invention illustrated in the drawings, the numeral 10 indicates generally a fifth wheel plate which is secured to the bottom of a trailer frame (not shown). The king pin 12 is secured by means of an integral flange portion 14 to the fifth wheel plate 10 by any suitable means, such as by rivets 16. The kingpin is of conventional construction and has an annular groove 18 adjacent the lower end.

The split collar, indicated generally at 20, is constructed of two semi-annular sections 22 and 24. The two sections are hingedly secured adjacent one end by providing a slot 26 in the section 22 into which is inserted a tongue portion 28 integrally formed on the section 24. A pin 30 is secured in the section 22, bridging the slot 26 and passing through a hole 32 in the tongue 28 of the section 24, thereby pivotally securing the tongue within the slot. The other ends of the sections 22 and 24 of the collar abut along flat surfaces 34 and 36 when in closed position.

The diameter of the circular opening provided by the inner surface of the semi-annular sections 22 and 24 when they are in the closed position is substantially equal to the inner diameter of the annular groove 18. In addition, the thickness of the sections 22 and 24 adjacent the inner periphery is substantially equal to the width of the annular groove 18, so that when the collar is clamped in position around the kingpin 12, the semi-annular sections 22 and 24 engage the annular groove 18. Arcuate flange portions 38 are integrally formed on the top and bottom faces of the semi-annular sections 24 and 22, the flanges 38 enclosing the kingpin on either side of the annular groove 18, as particularly shown in Fig. 2. The purpose of the flanges is to provide additional strength to the lock collar.

To secure the free ends of the semi-annular sections 22 and 24 in clamped relationship about the kingpin 12, a latch 40 is pivotally secured to the section 22. To this end a slot 42 is provided in the section 22 adjacent the face 34, the latch 40 being inserted in the slot and pivotally secured therein by means of a pin 44. A slot 46 in the section 24 receives the latch 40 when the split sections of the collar 20 are closed.

A notch 48 in the latch 40 is adapted to engage a catch portion 50 bridging the slot 46 and preferably integrally formed with the annular section 24. Thus, when the two sections of the collar are clamped around the kingpin 12, the latch 40 is pushed into the slot 46, the notch 48 of the latch engaging the catch portion 50 to prevent separation of the two sections of the collar.

To lock the latch 40 in the latching position, a key-operated lock 52 is provided. The barrel of the lock 52 is received in a hole 54 drilled in the section 24 adjacent the slot 46. The barrel of the lock bottoms against a flange 56 integrally formed adjacent the outer opening of the hole 54 and is secured in position by any suitable means, such as a snap ring 58. The key lock operates a bolt 60 which slides into and out of the area of the slot 46 with the turning of the key 62. A slot 64 is provided in the edge of the latch 40 in such position that the bolt 60 engages the slot 64 when the latch is in locking position. Thus, the key-operated lock 52, by means of the bolt 60 engaging the slot 64, secures the latch 40 in locked position so as to prevent separation of the two sections 22 and 24 of the collar 20. The sections of the collar cannot be opened as long as the latch 40 is in position to engage the catch portion 50, and the latch 40 cannot be moved out of position as long as the bolt 60 engages the slot 64 in the latch 40.

A cover 66, secured in position by means of screws 68, closes off the hole 54 to prevent dirt and other foreign substances from getting into the lock.

From the above description, it will be recognized that the objects of our invention have been achieved by providing a split collar type lock which clamps and locks securely in position on the kingpin to prevent engagement of the kingpin with the fifth wheel of a tractor. All sections of the collar form a unitary structure which is easily locked in position. The sections of the collar and the latch are of cast steel to provide the necessary strength to the collar. Since no strain is taken by the key lock and lock bolt, these parts can be comparatively light and inexpensive.

While in accordance with the patent statutes, one best known embodiment of our invention has been illustrated and described, it is to be particularly understood that we are not to be limited thereto or thereby, but that the scope of our invention is defined in the appended claims.

We claim:

1. A split collar lock for a fifth wheel kingpin, said kingpin having an annular groove, the collar including two substantially semi-annular hinged sections, the sections being the same thickness as the annular groove and the inner diameter of the collar being substantially equal to the diameter of the annular groove whereby the sections close around the kingpin within the annular groove, semi-circular flanges integrally formed on opposite faces of the sections of the collar, said flanges enclosing the kingpin on either side of the annular groove, a latch having a slot in an edge thereof, one of said sections having a slot, the latch being pivotally secured in the slot, the other of said sections having a similar slot, the latch engaging said last slot when the sections are in locking position, a catch portion bridging said last slot, said latch having a notch adapted to receive said catch portion when in locking position, and a key-operated bolt, the bolt being adapted to engage the slot in the latch to secure the latch in locking position with the catch.

2. A split collar lock for a fifth wheel kingpin, said kingpin having an annular groove, the collar including two substantially semi-annular hinged sections, the sections being the same thickness as the annular groove and the inner diameter of the collar being substantially equal to the diameter of the annular groove whereby the sections close around the kingpin within the annular groove, a latch having a slot in an edge thereof, one of said sections having a slot, the latch being pivotally secured in the slot, the other of said sections having a similar slot, the latch engaging said last slot when the sections are in locking position, a catch portion bridging said last slot, said latch having a notch adapted to receive said catch portion when in locking position, and a key-operated bolt, the bolt being adapted to engage the slot in the latch to secure the latch in locking position with the catch.

3. A lock for a trailer adapted to engage and encircle an annularly grooved fifth wheel kingpin, the lock including two substantially semi-annular sections, the sections combining to form a collar which engages and encircles the kingpin in the annular groove, a tongue secured to and extending beyond one end of one section, the other section having a groove receiving said tongue, a hinge pin extending transversely through the tongue and pivotally securing one end of each section to the other section, a latch having a recess therein for holding the free ends of the semi-annular sections together, one of said sections having a slot in the free end thereof receiving said latch, a hinge pin extending transversely through the latch for pivotally securing the latch to said section, the second section having a similar slot in the free end thereof, the latch engaging the second section within the slot, a catch portion bridging the slot in the second section, the latch having a notch therein receiving said catch portion to securely clamp the free ends of the semi-annular sections together, a key-lock mounted in the second section adjacent the slot, and a bolt actuated by turning the key-lock, said bolt engaging the recess in the latch whereby the latch is secured against disengagement with the catch portion.

4. A lock for a trailer adapted to engage and encircle an annularly grooved fifth wheel kingpin, the lock including two substantially semi-annular sections, the sections combining to form a collar which engages and encircles the kingpin in the annular groove, means pivotally securing one end of each section to the other section, a latch for holding the free ends of the semi-annular sections together, one of said sections having a slot in the free end thereof receiving said latch, a hinge pin extending transversely through the latch for pivotally securing the latch to said section, the second section having a similar slot in the free end thereof, the latch engaging the second section within the slot, a catch portion bridging the slot in the second section, the latch having a notch therein receiving said catch portion to securely clamp the free ends of the semi-annular sections together, a key-lock mounted in the second section adjacent the slot, and a bolt actuated by turning the key-lock, said bolt engaging the latch whereby the latch is secured against disengagement with the catch portion.

5. A lock for a trailer adapted to engage and encircle an annularly grooved fifth wheel kingpin, the lock including two substantially semi-annular sections, the sections combining to form a collar which engages and encircles the kingpin in the annular groove, means pivotally securing one end of each section to the other section, a latch for holding the free ends of the semi-annular sections together and having a slot therein, one of said sections having a slot in the free end thereof receiving said latch, a hinge pin extending transversely through the latch for pivotally securing the latch to said section, the second section having a similar slot in the free end thereof, the latch engaging the second section within the slot, a catch portion bridging the slot in the second section, the latch having a notch therein receiving said catch portion to securely clamp the free ends of the semi-annular sections together, and a key-actuated bolt, said bolt engaging the slot in the latch whereby the latch is secured against disengagement with the catch portion.

6. A lock for a trailer adapted to engage and encircle an annularly grooved fifth wheel kingpin, the lock including two substantially semi-annular sections, the sections combining to form a collar which engages and encircles the kingpin in the annular groove, a tongue secured to and extending beyond one end of one section, the other section having a groove receiving said tongue, a hinge pin extending transversely through the tongue and pivotally securing one end of each section to the other section, a latch for holding the free ends of the semi-annular sections together, the latch being hingedly secured to one of the sections, the second section having a slot in the free end thereof, the latch engaging the second section within the slot, a catch portion bridging the slot in the second section, the latch having a notch therein receiving said catch portion to securely clamp the free ends of the semi-annular sections together, a key-lock mounted in the second section adjacent the slot, and a bolt actuated by turning the key-lock, said bolt engaging the latch whereby the latch is secured against disengagement with the catch portion.

7. A lock for a trailer adapted to engage and encircle an annularly grooved fifth wheel kingpin, the lock including two substantially semi-annular sections, the sections combining to form a collar which engages and encircles the kingpin in the annular groove, a tongue secured to and extending beyond one end of one section, the other section having a groove receiving said tongue and a latch means receiving slot therein, a hinge pin extending transversely through the tongue and pivotally securing one end of each section to the other section, latch means pivotally secured to one section and releasably engaging the other section to clamp the free ends of the sections and latch means combining to form a lock having a smooth cylindrical surface, a key-lock mounted in the second section adjacent the slot, and a bolt actuated by turning the key-lock, said bolt engaging the latch whereby the latch is secured against disengagement with said other section.

8. A lock for a trailer adapted to engage and encircle an annularly grooved fifth wheel kingpin, the lock including two substantially semi-annular sections, the sections combining to form a collar which engages and encircles the kingpin in the annular groove, each of the sections having axially extending flanges of the outer surfaces thereof for engaging the kingpin immediately adjacent the grooves therein, means pivotally securing one end of each section to the other section, latch means pivotally secured to one section and releasably engaging the other section to clamp the free ends of the sections together, one said section having a latch means receiving slot therein, a key-lock mounted in the said one section adjacent the slot, and a bolt actuated by turning the key-lock, said bolt engaging the latch whereby the latch is secured against disengagement with said other section.

9. A lock for a trailer adapted to engage and encircle an annularly grooved fifth wheel kingpin, the lock including two substantially semi-annular sections, the sections combining to form a collar which engages and encircles the kingpin in the annular groove, means pivotally securing one end of each section to the other section, latch means having a slot therein pivotally secured to one section and releasably engaging the other section to clamp the free ends of the sections together, and a key-actuated bolt, said bolt engaging the slot in the latch whereby the latch is secured against disengagement with said other section.

10. A lock for a trailer adapted to engage and encircle an annularly grooved fifth wheel kingpin, the lock including two substantially semi-annular sections, the sections combining to form a collar which engages and encircles the kingpin in the annular groove, means pivotally securing one end of each section to the other section, one of said sections having a latch means receiving slot intermediate the margins thereof at the free end thereof, latch means pivotally secured to the second section and releasably engaging and extending into said slot which is formed in the other section to clamp the free ends of the sections together, and locking means for locking the latch against disengagement with the said other section.

GUY L. LUCAS.
WILLIAM D. EDWARDS.
RALPH S. CHAFFIN.

References Cited in the file of this patent

UNITED STATES PATENTS

| Number | Name | Date |
|---|---|---|
| 1,221,354 | Mitchell | Apr. 3, 1917 |
| 1,329,913 | McGuire | Feb. 3, 1920 |
| 2,440,744 | Grinnell et al. | May 4, 1948 |
| 2,469,973 | Malluk | May 10, 1949 |
| 2,554,306 | Mack | May 22, 1951 |

FOREIGN PATENTS

| Number | Country | Date |
|---|---|---|
| 606,882 | France | Mar. 15, 1926 |